March 1, 1960 J. J. SULLIVAN 2,926,869
VERTICAL AND HORIZONTAL FLIGHT AMPHIBIOUS AIRCRAFT
Filed Oct. 1, 1956 2 Sheets-Sheet 1

INVENTOR.
John J. Sullivan
AGENT

March 1, 1960          J. J. SULLIVAN          2,926,869
VERTICAL AND HORIZONTAL FLIGHT AMPHIBIOUS AIRCRAFT
Filed Oct. 1, 1956          2 Sheets-Sheet 2
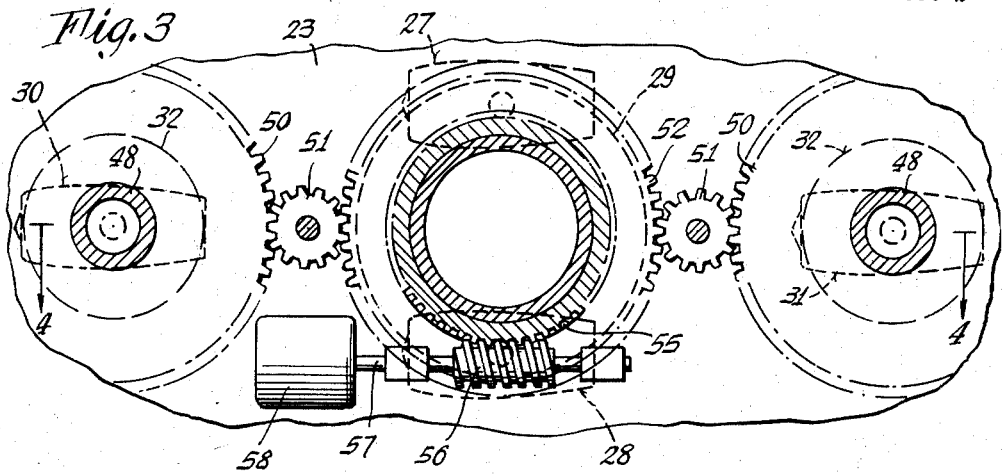
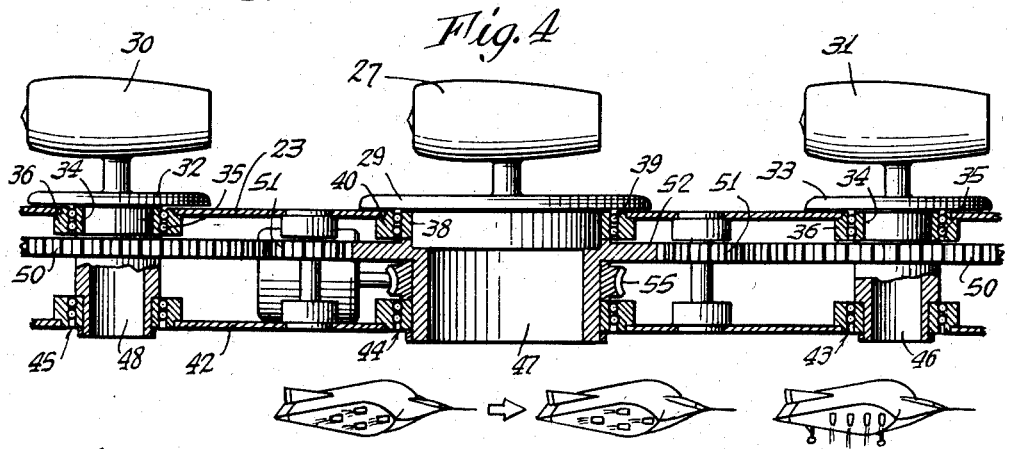
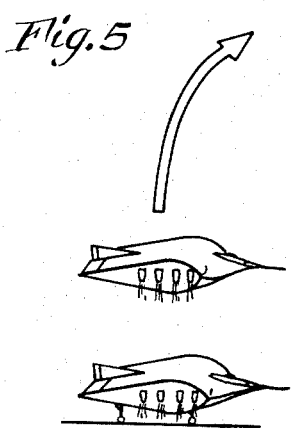
INVENTOR.
John J. Sullivan
BY
AGENT

United States Patent Office 2,926,869
Patented Mar. 1, 1960

2,926,869

VERTICAL AND HORIZONTAL FLIGHT AMPHIBIOUS AIRCRAFT

John J. Sullivan, Norfolk, Va.

Application October 1, 1956, Serial No. 613,144

14 Claims. (Cl. 244—12)

This invention relates to aircraft which are capable of both vertical takeoff and flight, and horizontal flight; the invention relates more particularly to aircraft of this type wherein the transition from horizontal to vertical flight and vice versa does not involve any appreciable change in the attitude or angular position of the craft.

While the aircraft of this invention is shown as being propelled by jet aircraft engines, it should be understood that such showing is for illustrative purposes, and is not to be taken in a restrictive sense, since other types of thrust-producing engines or units may be utilized without departing from the spirit of the invention.

One object of the invention is to provide a novel and improved aircraft capable of vertical takeoff and flight, and horizontal flight, wherein there is attained for horizontal flight the maximum degree of efficiency, lifting force, speed, and accordingly the maximum possible pay load.

Another object of the invention is to provide a novel and improved aircraft capable of both vertical and horizontal flight, wherein the same propulsion means is utilized for both purposes, thereby effecting a desirable economy, efficiency, and saving of weight.

A still further object of the invention is to provide an improved aircraft as above characterized, wherein reliable and comparatively simple means are provided to effect the two different kinds of flight.

A feature of the invention resides in the provision of an improved vertical and horizontal flight aircraft wherein there is utilized to the fullest possible extent the principles of aerodynamic design, by which wind and friction resistances are reduced, while maintaining maneuverability, strength and lift.

A still further object of the invention is to provide an improved and novel aircraft having the above advantages, and which is capable of alighting and floating on water as well as on land, and capable of takeoff from water, all with marked stability and ease.

A still further feature of the invention resides in the provision of improved and simplified, yet effective and reliable control means for actuating and redirecting the propulsion engines or units in a vertical and horizontal flight aircraft.

Another object of the invention is to provide an improved, vertical and horizontal flight aircraft having a plurality of individual propulsion means along each side edge of the aircraft body, wherein during horizontal flight the individual propulsion means are either staggered or else so greatly spaced as to not appreciably interfere with each other, while for vertical flight the individual propulsion units are disposed all in a relatively high plane so as to not meet with interference from the supporting surface on which the aircraft rests.

Still another object of the invention is to provide an improved vertical and horizontal flight aircraft in accordance with the above, wherein for the major portion of the body a box-type construction may be utilized, thereby to realize the advantages of strength and sturdiness, and also provide more useful space for crew, fuel, passenger, and cargo use.

In conjunction with the immediately-preceding object, a feature of the improved aircraft of this invention resides in the provision of a wing-type body having a sufficiently great dimension between its upper and lower wing surfaces to permit at least two and possibly three decks to be incorporated therein, thereby further strengthening the framework of the body.

Yet another object of the invention is to provide an aircraft having all of the above features and advantages, and which is at the same time amphibious and equally well adapted for takeoff from and landing on the water.

Other features and advantages will hereinafter appear.

In the drawings accompanying this specification, similar characters of reference indicate corresponding parts wherever possible in the several views, in which:

Fig. 3 is a vertical section taken on line 3—3 of Fig. 2.

Fig. 4 is a horizontal section taken on line 4—4 of Fig. 3.

Fig. 5 is a diagrammatic representation of the aircraft, indicating the mode of flight thereof in alighting, cruising and landing.

Figure 1:
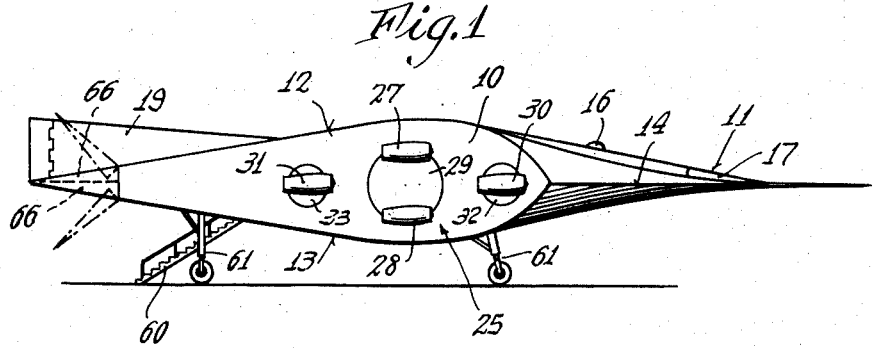
Figure 1 is a side elevational view of an aircraft made in accordance with the invention, showing the shiftable propulsion means or units, by which both vertical and horizontal flight are effected.

As shown, the improved vertical takeoff aircraft of the present invention comprises a body 10 which is in the nature of a flying wing, said body having a pointed, slender nose 11, upper and lower expansive wing surfaces 12 and 13 respectively, leading edges 14 and trailing edges 15.

Preferably, in accordance with the invention, the trailing edges 15 are made to have a substantially straight outline, whereas the leading edges 14 taper or slope backward from the central or nose portion 11.

On the upper wing surface 12 a transparent dome 16 may be provided, for observation use, and a cockpit and pilot's cabin 17 may be centrally disposed in and to the rear of the nose portion 11.

The forward and mid portions of the wing or body 10 are made to have a sufficiently great dimension between the upper and lower wing surfaces 12 and 13 so that it may contain within it adequate crew and passenger accommodations, including at least two decks and possibly three.

For maneuvering, the trailing edges 15 of the body 10 may have ailerons 18, and a central rudder 19 may be provided at the outer rear.

Figure 2:
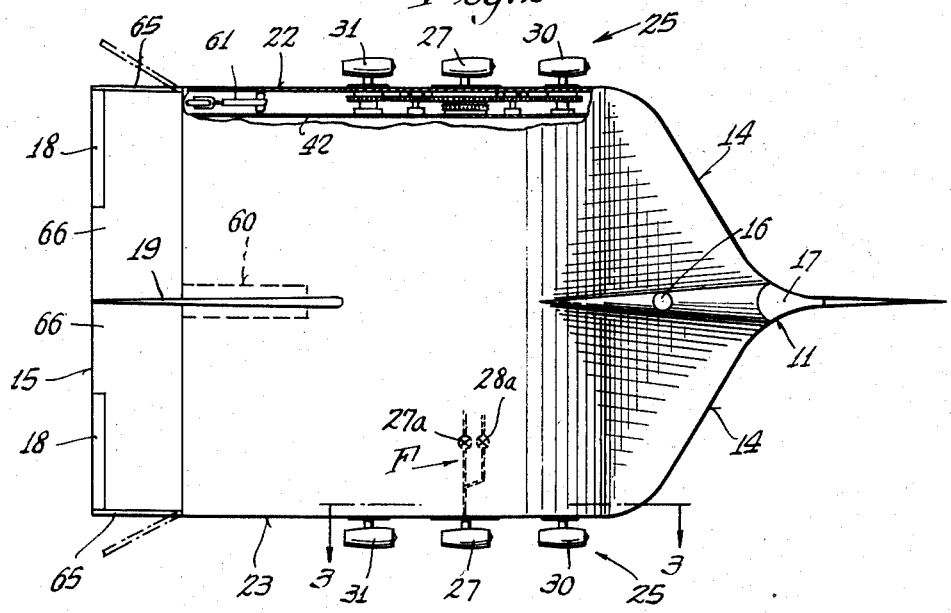
Fig. 2 is a top or plan view of the aircraft of Fig. 1, shown partly in horizontal section to reveal interior details.

Referring to Fig. 2, the body 10 has oppositely disposed side edges 22 and 23 extending between the front or leading edges 14 and the rear or trailing edges 15, said side edges being generally flat or planar at the mid portions of the body.

In accordance with the present invention, I provide propulsion engines or units 25 at both side edges 22 and 23 of the body 10, in conjunction with means by which said propulsion engines may be angularly shifted to change the direction of thrust from transverse with respect to the body, to longitudinal with respect to he body, as well as in between or angular directions. I provide novel, simple and effective control means in conjunction with such propulsion, and novel and improved mounting means by which relatively little space is required within the body 10, and by which powerful and effective lifting forces may be exerted thereon to lift the aircraft body vertically, as well as horizontal forces for cruising purposes.

Moreover, I effect an advantageous disposition of the individual propulsion means or units by which a reactive effect is obtained, materially reducing the power requirements needed to shift the propulsion means; also, under certain circumstances, by such organization of the propulsion means they may be made to virtually completely power the shifting operation, thereby to simplify the control mechanism and minimize the power requirements thereof. In connection with the latter, through suitable control of selected propulsion units, all said units may be shifted by utilizing the propulsion power itself, and therefore the control means may function mostly as a braking or retarding mechanism, instead of as a source of appreciable power having large enough capacity to redirect the powerful propulsion means of the craft.

Accordingly, referring to Figs. 1, 3 and 4, I provide at each side edge 22, 23 of the body 10 a plurality of propulsion engines, as already indicated generally by the numeral 25. I arrange the propulsion engines in a novel manner, for one reason to effect the desirable control aforementioned. For example, where four such engines are provided at each side edge 22, 23, as illustrated herein, two engines 27, 28 are carried by a common member or turnable mounting plate 29, herein also termed a turntable, said engines being disposed on opposite sides of the axis of the turntable and arranged so that the turning moments exerted by them are in opposition. Also, preferably at each side edge of the body 10 a single engine or propulsion unit 30 is mounted, ahead of the turntable 29, and another single engine 31 to the rear of the turntable.

Referring to Figs. 3 and 4 the engines 30 and 31 are carried by mounting members 32 and 33 respectively, which members having bearing races 34 engaged by antifriction roller bearings 35 which in turn travel in annular bearing races 36 carried by the side edges 22, 23 of the body 10.

The turntables 29 have annular races 38 engaging antifriction rollers 39 which in turn engage internal annular races 40 carried by the side edges 22, 23.

For the purpose of providing additional sturdy bearings for the propulsion engines 25, I provide within the body 10 inner walls 42 spaced inwardly from and extending along the side edges 22, 23. The inner walls 42 have antifriction bearing means 43, 44 and 45 connected by shafts 46, 47 and 48 respectively with the members 33, 29 and 32.

It will be readily apparent that, by the above organization, there is provided a sturdy and reliable means by which the engines 27, 28, 30 and 31 may be turnably shifted, to change the direction of thrust exerted by them. When it is desired that the aircraft rise vertically, the engines 25 at the side edges 22, 23 are shifted so that the thrusts thereof on the body 10 are directed upward. After the craft has risen to the desired height, the engines 25 are turnably shifted through angles of approximately 90 degrees, to direct their thrusts (on the body 10) forward. It should be understood that this transition may be carried out at speed found most desirable to suit existing conditions, and that the trim or attitude of the body 10 may be maintained by controlling the degree of thrust exerted by the various individual engines.

For the purpose of providing a reliable and effective control for shifting the engines 25, and to enable the opposed moments of the engines 27 and 28 to be properly utilized, I provide coupling means disposed between the inner walls 42 and the side edges 22, 23, for effecting a simultaneous turning or shifting movement of the engines at each side edge of the craft. In accomplishing this, spur gears 50 may be rigidly affixed to the mounting members 32 and 33 of the engines 30, 31, idler gears 51 may be provided, engaging the said spur gears, and a spur gear 52 may be provided, affixed to the turntable 29 and engaging the idlers 51. With this organization, all of the engines 25 at either side of the aircraft may be made to shift simultaneously, to change the direction of their thrusts.

Affixed to the spur gear 52 is a large worm gear 55 engaged by a driving worm 56 carried on a shaft 57 which is powered by a suitable driving motor 58. Accordingly, operation of the motor 58 in either of reverse directions will effect shifting in one direction or the other of the propulsion engines 25, thereby to enable the aircraft to arise vertically or fly horizontally without appreciably changing the position or attitude of the body 10.

An important feature of this invention resides in the provision of the said opposed-moment engines 27, 28. By such organization, increasing or decreasing the power of either of the engines 27, 28, as by actuation of valves 27a and 28a in the fuel lines F of the engines, may result in a powerful turning moment being applied to the turntable 29, and this turning moment may be made to assist the drive being effected by the motor 58, or to oppose such drive. Accordingly, a very effective and flexible control organization is had, whereby the motors 58 may, in adjusting, be used either for driving or for braking. It will be readily appreciated that, by virtue of suitable control of the propulsion engines 27, 28 the shifting of all of the propulsion engines may be effected without excessively great power on the part of the motors 58. Therefore, the thrusts of the propulsion means may be used to advantage, by this invention, to effect a shift of such propulsion means, and inasmuch as powerful forces are involved in the lifting and propulsion of the aircraft, this is an important advantage.

While a single worm 56 is shown as engaging the worm gear 55, it should be understood that two worms may be utilized, or even more, in conjunction with the single gear 55 at each side of the aircraft.

Where desired, additional side rudders 65 may be provided, movable to the dotted line positions shown in Fig. 2 for the purpose of assisting the main rudder 19. Also, braking flaps 66 may be provided at the rear edges 15 of the body 10, said flaps being movable to extended positions as shown in broken outline in Fig. 1.

From the above it will be understood that I have provided a relatively simple, yet reliable and effective control mechanism for shifting propulsion engines to effect either lifting or cruising or both, of a vertical takeoff aircraft, and have provided a novel propulsion arrangement and mounting means therefor, by which the desired type of flight may be readily obtained, as well as transition from one type of flight to the other.

The control mechanism is conveniently and advantageously closeted between the spaced bearing walls at the sides of the body 10, and maximum strength and sturdiness are thereby effected, with the greatest possible saving of space. Moreover, with the above improved arrangement of propulsion means, no detrimental limitations are imposed on the shape of the body 10, and such body may therefore be designed in accordance with advantageous aerodynamic principles.

Moreover, as provided by the above construction, it is possible to rotatably shift the propulsion units 25 through an arc much greater than 90 degrees, where this may be desired, and in fact the engines may be shifted through as much as 360 degrees or one complete revolution, where conditions would warrant such a transition.

It will be noted from Figs. 1 and 5 that the propulsion units 25 will all be disposed in a straight horizontal line, when vertical flight is being experienced, and this has the advantage that the lowermost engines 28 are appreciably raised, so as to be above the water line of the craft. Therefore, the likelihood of interference between any of the propulsion units and the supporting surface on which the aircraft rests, is minimized. Moreover, when the propulsion units 25 are arranged for horizontal flight, as in Figs. 1 and 5, the propulsion units will be either staggered or else appreciably spaced from each other, thereby to minimize interference of one unit with another.

It will be understood from a consideration of Figs. 1, 2 and 5 that much of the body 10 may be formed of framework having a box-like shape or construction, whereby great strength may be incorporated in the craft, and also a rigid mounting structure for the propulsion units. Moreover, such a body or air frame construction provides more useful space for crew, fuel, passenger and cargo accommodation.

As shown in Figs. 1 and 2, entrance to the aircraft may be through a suitable ramp 60, which may be lowered from the central rear portion of the body 10.

Landing gear 61 may be provided, disposed at the side edges 22, 23, to support the aircraft when it alights on a firm supporting surface.

Variations and modifications may be made within the scope of the claims and portions of the improvements may be used without others.

I claim:

1. An aircraft capable of both vertical and horizontal flight, comprising a body having front and rear, leading and trailing edges, oppositely-disposed expansive upper and lower surfaces extending between said edges, and elongate, opposite substantially flat, airfoil-shaped side surfaces extending between the extremities of the said front and rear edges and spanning the upper and lower side edges of the upper and lower surfaces, said body being of sufficiently great height between its oppositely-disposed expansive surfaces and at points adjoining its side surfaces to contain within it crew and passenger accommodations; a plurality of aircraft engines disposed at each of the said opposite side surfaces of the body; means mounting said engines for rotatable, shifting movement, enabling the engines to exert thrusts either forwardly of or upward with respect to said body; coupling means disposed at the insides of said side surfaces and extending along said insides, for effecting simultaneous rotary shifting movements of said engines; and power means connected with said coupling means, for shifting the said engines to change the direction of thrust thereof with respect to said body.

2. An aircraft capable of both vertical and horizontal flight, comprising a wing having front and rear, leading and trailing edges, oppositely-disposed upper and lower wing surfaces extending between said edges, and elongate, opposite side surfaces extending between the extremities of the said front and rear edges, said wing being of sufficiently great height between its oppositely-disposed wing surfaces to contain within it crew and passenger accommodations; pairs of aircraft engines disposed at the said opposite side surfaces of the wing; means mounting said engines for rotatable, shifting movement, enabling the engines to exert thrusts either forwardly of or upward with respect to said wing; power means connected with said mounting means, for shifting the said engines to change the direction of thrust thereof with respect to said wing, said mounting means comprising two turntables respectively at and flush with said side surfaces, each turntable carrying on its outside two engines facing in the same direction and disposed at opposite sides of the axis of the turntable, the thrust of one engine exerting a turning moment on the turntable which is opposite to that exerted by the thrust of the other engine.

3. An aircraft capable of both vertical and horizontal flight, comprising a wing having front and rear, leading and trailing edges, oppositely-disposed upper and lower wing surfaces extending between said edges, and elongate, opposite side surfaces extending between the extremities of the said front and rear edges, said wing being of sufficiently great height between its oppositely-disposed wing surfaces to contain within it crew and passenger accommodations; pairs of aircraft engines disposed at the said opposite side surfaces of the wing; means mounting said engines for rotatable, shifting movement, enabling the engines to exert thrusts either forwardly of or upward with respect to said wing; power means connected with said mounting means, for shifting the said engines to change the direction of thrust thereof with respect to said wing, said mounting means comprising two turntables respectively at and flush with said side surfaces, each turntable carrying on its outside two engines facing in the same direction and disposed at opposite sides of the axis of the turntable, the thrust of one engine exerting a turning moment on the turntable which is opposite to that exerted by the thrust of the other engine; four additional engines, disposed two at each side surface of the wing, two of said additional engines being located forwardly of the said pairs of engines and the other two additional engines being located rearwardly thereof; means mounting said additional engines on the side surfaces of the wing for turnable shifting movement; and means coupling said additional engines to the pairs of engines for simultaneous shifting therewith.

4. An aircraft capable of both vertical and horizontal flight, comprising a body having front and rear, leading and trailing edges, oppositely-disposed expansive upper and lower surfaces extending between said edges, and elongate, opposite side surfaces extending between the extremities of the said front and rear edges, said body being of sufficiently great height between its oppositely-disposed expansive surfaces to contain within it crew and passenger accommodations; pairs of aircraft engines disposed at the said opposite side surfaces of the body; means mounting said engines for rotatable, shifting movement, enabling the engines to exert thrusts either forwardly of or upward with respect to said body; power means connected with said mounting means, for shifting the said engines to change the direction of thrust thereof with respect to said body, said body having inner, additional walls disposed along and spaced from the said side surfaces thereof, said mounting means including bearings engaging said inner walls, and other bearings disposed at the said side surfaces; and coupling means disposed between said inner walls and side surfaces, for effecting simultaneous rotary shifting movements of said engines, said bearings being located at opposite sides of the said coupling means.

5. An aircraft capable of both vertical and horizontal flight, comprising a wing having front and rear, leading and trailing edges, oppositely-disposed upper and lower wing surfaces extending between said edges, and elongate, opposite side surfaces extending between the extremities of the said front and rear edges, said wing being of sufficiently great height between its oppositely-disposed wing surfaces to contain within it crew and passenger accommodations; pairs of aircraft engines disposed at the said opposite side surfaces of the wing; means mounting said engines for rotatable, shifting movement, enabling the engines to exert thrusts either forwardly of or upward with respect to said wing; power means connected with said mounting means, for shifting the said engines to change the direction of thrust thereof with respect to said wing, said mounting means comprising two turntables respectively at and flush with said side surfaces, each turntable carrying on its outside two engines facing in the same direction and disposed at opposite sides of the axis of the turntable, the thrust of one engine exerting a turning moment on the turntable which is opposite to that exerted by the thrust of the other engine, said mounting means including large-diameter pairs of annular races and rolling anti-friction means engaging the same, said turntables being rigid with individual races of the pairs respectively.

6. An aircraft capable of both vertical and horizontal flight, comprising a wing having front and rear, leading and trailing edges, oppositely-disposed upper and lower wing surfaces extending between said edges, and elongate, opposite side surfaces extending between the extremities of the said front and rear edges, said wing being of sufficiently great height between its oppositely-disposed wing surfaces to contain within it crew and passenger accommodations; pairs of aircraft engines disposed at the said opposite side surfaces of the wing; means mounting said engines for rotatable, shifting movement, enabling the engines to exert thrusts either forwardly of or upward with respect to said wing; power means connected with said mounting means, for shifting the said engines to change the direction of thrust thereof with respect to said wing, said mounting means comprising two turntables respectively at and flush with said side surfaces, each turntable carrying on its outside two engines facing in the same direction and disposed at opposite sides of the axis of the turntable, the thrust of one engine exerting a turning moment on the turntable which is opposite to that exerted by the thrust of the other engine, said power means including worm gears rigid with the turntables and powered worms, engaging and driving said gears.

7. An aircraft capable of both vertical and horizontal flight, comprising a wing having front and rear, leading and trailing edges, oppositely-disposed upper and lower wing surfaces extending between said edges, and elongate, opposite side surfaces extending between the extremities of the said front and rear edges, said wing being of sufficiently great height between its oppositely-disposed wing surfaces to contain within it crew and passenger accommodations; pairs of aircraft engines disposed at the said opposite side surfaces of the wing; means mounting said engines for rotatable, shifting movement, enabling the engines to exert thrusts either forwardly of or upward with respect to said wing; power means connected with said mounting means, for shifting the said engines to change the direction of thrust thereof with respect to said wing, said mounting means comprising two turntables respectively at and flush with said side surfaces, each turntable carrying on its outside two engines facing in the same direction and disposed at opposite sides of the axis of the turntable, the thrust of one engine exerting a turning moment on the turntable which is opposite to that exerted by the thrust of the other engine; means for selectively controlling the power of the engines of each pair, whereby one engine of each pair may be made to exert a thrust greater or less than the other engine, thereby to assist the said powered means in driving the turntable.

8. An aircraft capable of both vertical and horizontal flight, comprising a body having front and rear, leading and trailing edges, oppositely-disposed expansive upper and lower surfaces extending between said edges, and elongate, opposite side surfaces extending between the extremities of the said front and rear edges, said body being of sufficiently great height between its oppositely-disposed expansive surfaces to contain within it crew and passenger accommodations; pairs of aircraft engines disposed at the said opposite side surfaces of the body; means mounting said engines for rotatable, shifting movement, enabling the engines to exert thrusts either forwardly of or upward with respect to said body; power means connected with said mounting means, for shifting the said engines to change the direction of thrust thereof with respect to said body, said mounting means comprising two turntables respectively at and flush with said side surfaces, each turntable carrying on its outside two engines facing in the same direction and disposed at opposite sides of the axis of the turntable, the thrust of one engine exerting a turning moment on the turntable which is opposite to that exerted by the thrust of the other engine; two additional engines, one at each side surface of the aircraft; means mounting said additional engines for turnable shifting movement; and means coupling said additional engines to the turntables for simultaneous shifting therewith.

9. An aircraft capable of both vertical and horizontal flight, comprising a wing having front and rear, leading and trailing edges, oppositely-disposed upper and lower wing surfaces extending between said edges, and elongate, opposite side surfaces extending between the extremities of said front and rear edges, said wing being of sufficiently great height between its oppositely-disposed wing surfaces to contain within it crew and passenger accommodations; pairs of aircraft engines disposed at the said opposite side surfaces of the wing; means mounting said engines for rotatable, shifting movement, enabling the engines to exert thrust either forwardly of or upward with respect to said wing; power means connected with said mounting means, for shifting the said engines to change the direction of thrust thereof with respect to said wing, said mounting means comprising two turntables respectively at and flush with said side surfaces, each turntable carrying on its outside two engines facing in the same direction and disposed at opposite sides of the axis of the turntable, the thrust of one engine exerting a turning moment on the turntable which is opposite to that exerted by the thrust of the other engine; two additional engines, one at each side surface of the aircraft; means mounting said additional engines for turnable shifting movement; and means coupling said additional engines to the turntables for simultaneous shifting therewith, said wing having inner walls disposed along and spaced from the said side surfaces thereof, said mounting means including bearings engaging said inner walls and bearings disposed at the said side surfaces, said power means and means coupling the engines including gearing disposed between the side surfaces of the wing and the said inner walls.

10. An aircraft capable of both vertical and horizontal flight, comprising a body having front and rear, leading and trailing edges, oppositely-disposed expansive upper and lower surfaces extending between said edges, and elongate, opposite side surfaces extending between the extremities of the said front and rear edges, said body being of sufficiently great height between its oppositely-disposed expansive surfaces to contain within it crew and passenger accommodations; pairs of aircraft engines disposed at the said opposite side surfaces of the body; means mounting said engines for rotatable, shifting movement, enabling the engines to exert thrusts either forwardly of or upward with respect to said body; power means connected with said mounting means, for shifting the said engines to change the direction of thrust thereof with respect to said body, said mounting means comprising two turntables respectively at and flush with said side surfaces, each turntable carrying on its outside two engines facing in the same direction and disposed at opposite sides of the axis of the turntable, the thrust of one engine exerting a turning moment on the turntable which is opposite to that exerted by the thrust of the other engine; four additional engines, disposed two at each side surface of the body, two of said additional engines being located forwardly of the said pairs of engines and the other two additional engines being located rearwardly thereof; means mounting said additional engines on the side surfaces of the body for turnable shifting movement; and means coupling said additional engines to the pairs of engines for simultaneous shifting therewith, said engine mounting means aligning the engines at each side surface of the body in a straight line when the engines are positioned to apply thrust upward with respect to the body.

11. An aircraft capable of both vertical and horizontal flight, comprising a body having front and rear, leading and trailing edges, oppositely-disposed expansive upper and lower surfaces extending between said edges, and elongate, opposite side surfaces extending between the extremities of the said front and rear edges, said body being of sufficiently great height between its oppositely-disposed expansion surfaces to contain within it crew and passenger accommodations; pairs of aircraft engines disposed at the said opposite side surfaces of the body; means mounting said engines for rotatable, shifting movement, enabling the engines to exert thrusts either forwardly of or upward with respect to said body; power means connected with said mounting means, for shifting the said engines to change the direction of thrust thereof with respect to said body, said mounting means comprising two turntables respectively at and flush with said side surfaces, each turntable carrying on its outside two engines facing in the same direction and disposed at opposite sides of the axis of the turntable, the thrust of one engine exerting a turning moment on the turntable which is opposite to that exerted by the thrust of the other engine; four additional engines, disposed two at each side surface of the body, two of said additional engines being located forwardly of the said pairs of engines and the other two additional engines being located rearwardly thereof; means mounting said additional engines on the side surfaces of the body for turnable shifting movement; and means coupling said additional engines to the pairs of engines for simultaneous shifting therewith, said engine mounting means locating three of the engines at each side surface of the body when said engines are positioned to apply thrust forwardly of the body at different levels so as to create separate air streams.

12. An aircraft capable of both vertical and horizontal flight, comprising a body having front and rear, leading and trailing edges, oppositely-disposed expansive upper and lower surfaces extending between said edges, and elongate, opposite side surfaces extending between the extremities of the said front and rear edges, said body being of sufficiently great height between its oppositely-disposed expansive surfaces to contain within it crew and passenger accommodations; pairs of aircraft engines disposed at the said opposite side surfaces of the body; means mounting said engines for rotatable, shifting movement, enabling the engines to exert thrusts either forwardly of or upward with respect to said body; power means connected with said mounting means, for shifting the said engines to change the direction of thrust thereof with respect to said body, said mounting means comprising two turntables respectively at and flush with said side surfaces, each turntable carrying on its outside two engines facing in the same direction and disposed at opposite sides of the axis of the turntable, the thrust of one engine exerting a turning moment on the turntable which is opposite to that exerted by the thrust of the other engine; four additional engines, disposed two at each side surface of the body, two of said additional engines being located forwardly of the said pairs of engines and the other two additional engines being located rearwardly thereof; means mounting said additional engines on the side surfaces of the body for turnable shifting movement; and means coupling said additional engines to the pairs of engines for simultaneous shifting therewith, said engine mounting means locating the engines at each side surface of the body in a straight line when the engines are positioned to apply thrust upward with respect to the body, and locating three of the engines at each side surface when the engines are positioned to apply thrust forwardly of the body at different levels so as to create separate airstreams.

13. An aircraft capable of both vertical and horizontal flight, comprising a wing having front and rear, leading and trailing edges, oppositely-disposed upper and lower wing surfaces extending between said edges, and elongate, opposite side surfaces extending between the extremities of the said front and rear edges, said wing being of sufficiently great height between its oppositely-disposed wing surfaces to contain within it crew and passenger accommodation; pairs of aircraft engines disposed at the said opposite side surfaces of the wing; means mounting said engines for rotatable, shifting movement, enabling the engines to exert thrusts either forwardly of or upward with respect to said wing; power means connected with said mounting means, for shifting the said engines to change the direction of thrust thereof with respect to said wing, said mounting means comprising two turntables respectively at and flush with said side surfaces, each turntable carrying on its outside two engines facing in the same direction and disposed at opposite sides of the axis of the turntable, the thrust of one engine exerting a turning moment on the turntable which is opposite to that exerted by the thrust of the other engine; four additional engines, disposed two at each side surface of the wing, two of said additional engines being located forwardly of the said pairs of engines and the other two additional engines being located rearwardly thereof; means mounting said additional engines on the side surfaces of the wing for turnable shifting movement; and means coupling said additional engines to the pairs of engines for simultaneous shifting therewith, the engines at each side surface of the wing being disposed in a straight line when positioned to apply thrust upward with respect to the wing, and three of the engines at each side surface when positioned to apply thrust forwardly of the wing being disposed at different levels so as to create separate air streams, two of the engines at each side surface of the wing being aligned when exerting forward thrust, said two engines being spaced apart a distance greater than the spacing between the engines of any other pair.

14. An aircraft capable of both vertical and horizontal flight, comprising a body having front and rear, leading and trailing edges, oppositely-disposed expansive upper and lower surfaces extending between the extremities of the said front and rear edges, said body being of sufficiently great height between its oppositely-disposed expansive surfaces to contain within it crew and passenger accommodations; pairs of aircraft engines disposed at the said opposite side surfaces of the body; means mounting said engines for rotatable, shifting movement, enabling the engines to exert thrusts either forwardly of or upward with respect to said body; power means connected with said mounting means, for shifting the said engines to change the direction of thrust thereof with respect to said body, said body having inner, additional walls disposed along and spaced from the said side surfaces thereof, said mounting means including bearings engaging said inner walls, and other bearings disposed at the said side surfaces; coupling means disposed between said inner walls and side surfaces, for effecting simultaneous rotary shifting movement of said engines, said bearings being located at opposite sides of the said coupling means; and forward and rear landing gear disposed adjacent each of the opposite side surfaces of the body, for supporting the same while on the ground.

References Cited in the file of this patent

UNITED STATES PATENTS

| | | |
|---|---|---|
| D. 174,679 | Cochran | May 10, 1955 |
| 1,851,867 | Rieder | Mar. 29, 1932 |
| 2,294,367 | Fleming | Sept. 1, 1942 |
| 2,344,945 | Knox et al. | Mar. 28, 1944 |
| 2,397,526 | Bonbright | Apr. 2, 1946 |
| 2,431,449 | Ashkenas et al. | Nov. 25, 1947 |
| 2,561,291 | Rethorst | July 17, 1951 |
| 2,568,021 | Northrop | Sept. 18, 1951 |
| 2,762,584 | Price | Sept. 11, 1956 |